UNITED STATES PATENT OFFICE.

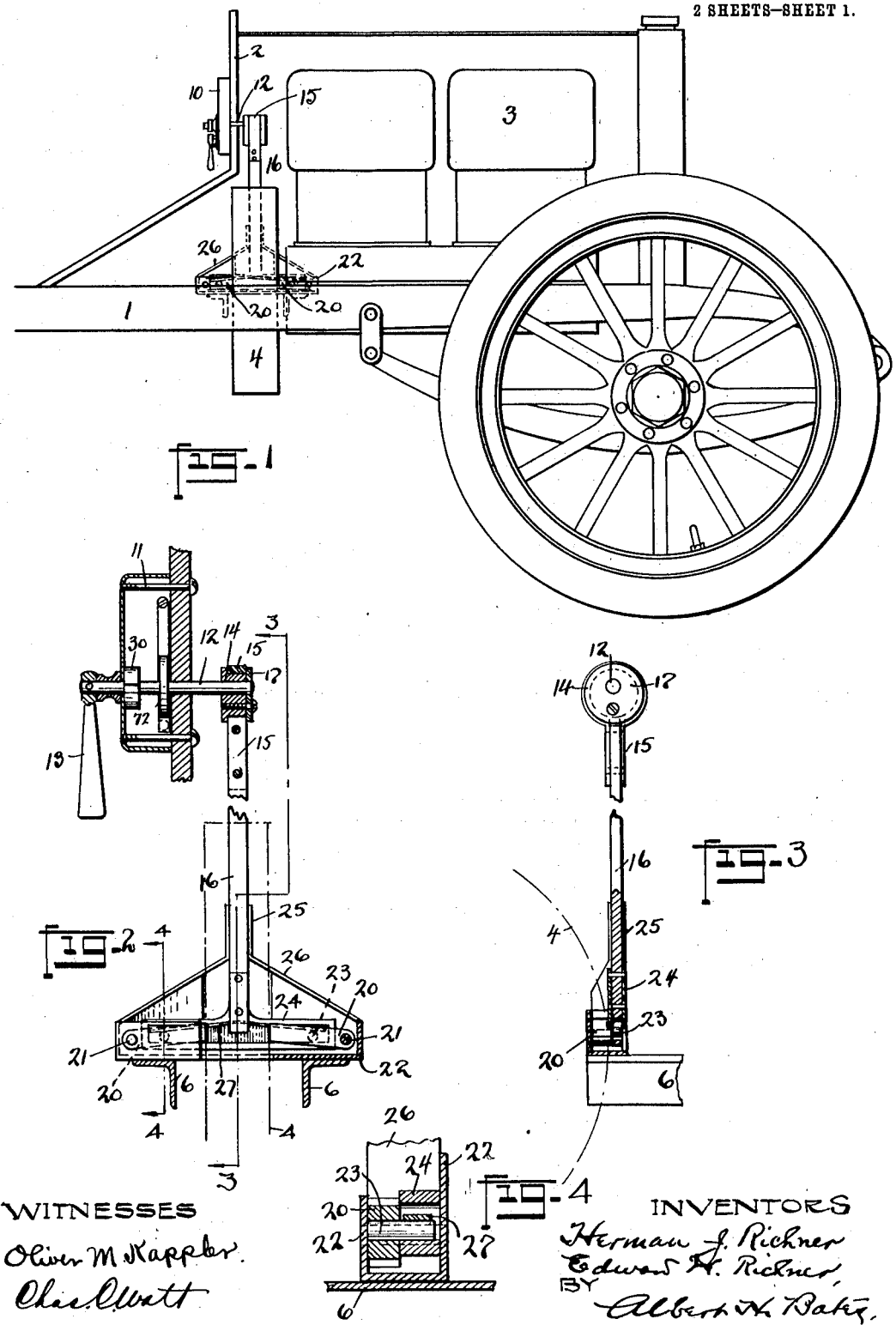

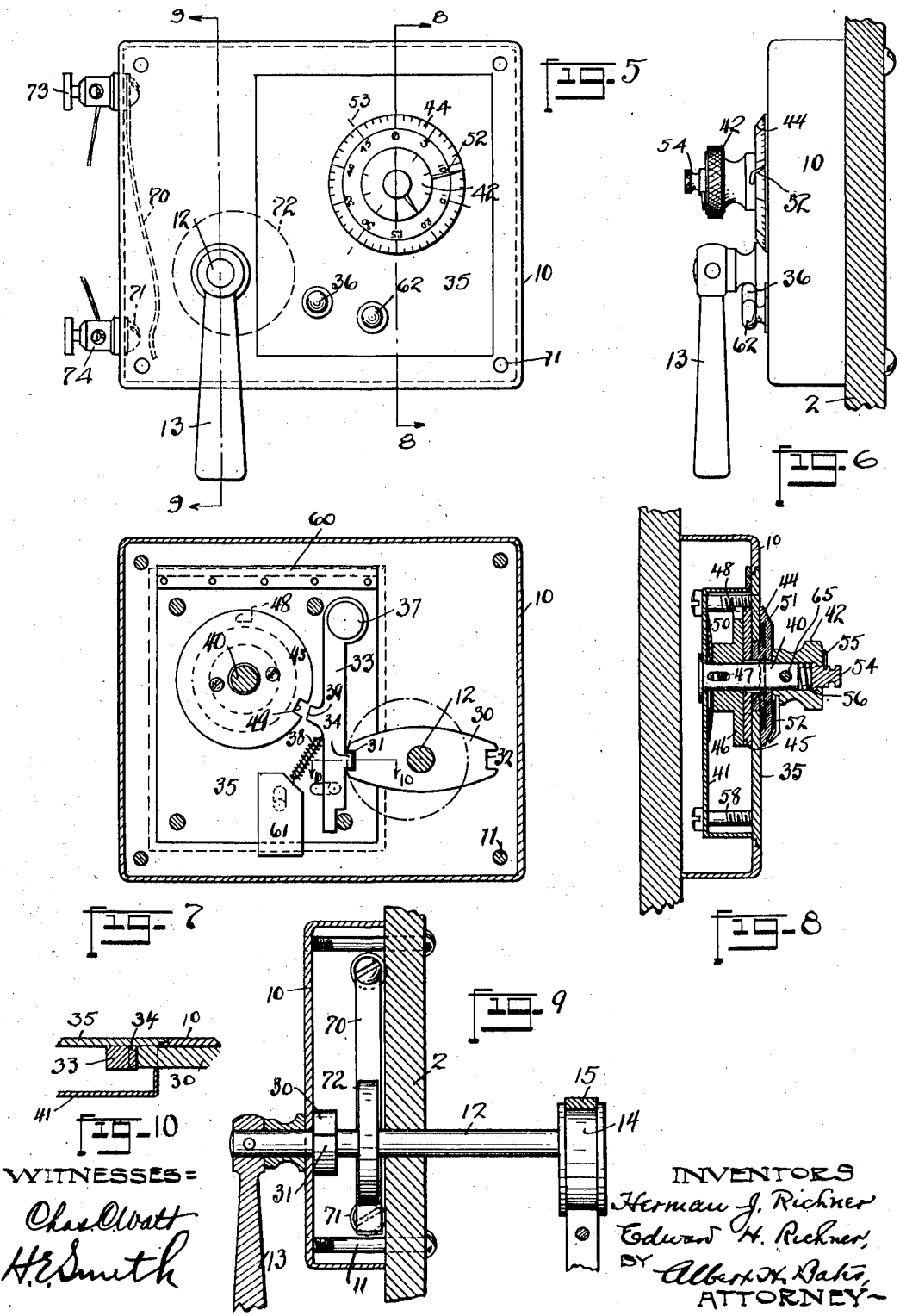

HERMAN J. RICHNER AND EDWARD H. RICHNER, OF CLEVELAND, OHIO.

AUTOMOBILE-LOCK.

1,048,211.  Specification of Letters Patent.  Patented Dec. 24, 1912.

Application filed February 19, 1912. Serial No. 678,705.

*To all whom it may concern:*

Be it known that we, HERMAN J. RICHNER and EDWARD H. RICHNER, citizens of the United States, residing at Cleveland, in the county of Cuyahoga and State of Ohio, have invented a certain new and useful Improvement in Automobile-Locks, of which the following is a full, clear, and exact description, reference being had to the accompanying drawings.

One of the objects of this invention is to provide an efficient lock for automobiles preventing their use by unauthorized persons.

Another object is to provide such a lock in such form that it can not be tampered with or rendered ineffective.

A third object is to provide the mechanism with a suitable combination lock, whereby the necessity of a key, with its liability to loss or duplication, is avoided.

A fourth object is to arrange the mechanism so that the combination of the lock may be changed, as desired, by one familiar with the combination, while the interior of the combination and the devices for securing the lock in place are inaccessible to one not familiar with the combination.

A fifth object is to provide for a double locking by both holding a necessary rotating part and breaking the electric circuit controlling the spark to an explosive engine or the source of current to the motor, as the case may be.

A final object of the invention is to provide the desired locking mechanism in a form which shall be simple in construction, and not liable to get out of order, while presenting a very neat appearance in use.

To the above end, we provide a clamp adapted to be forced into locking engagement with one of the moving parts of the driving mechanism, as, for example, the engine fly wheel, and we provide mechanism for operating the clamp, moving it to or from active position, and a combination lock for locking such mechanism. We arrange the actuating portion of this mechanism within a casing, which is adapted to be secured to the dash board of the vehicle, and we mount the combination lock proper on the inner side of the casing door with an operatable knob on the outer side of that door, the parts being arranged so that the door is automatically locked shut when the mechanism is locked. By securing the casing in place by bolts, or other means, not readily accessible, any tampering with the mechanism by one who does not know the combination is prevented. We may also, if desired, arrange the sparking or motor circuit so that it passes through a switch within the casing, which is automatically opened whenever the vehicle is locked. This provides a double locking of the vehicle.

Our invention is hereinafter more fully explained in connection with an approved embodiment thereof, shown in the drawings hereof, which will now be described.

In the drawings, Figure 1 is a side elevation of a front portion of an automobile equipped with our locking mechanism; Fig. 2 is a vertical section through the locking mechanism, the fly wheel of the engine being illustrated by broken lines; Figs. 3 and 4 are details, being vertical sections substantially as indicated by the lines 3—3 and 4—4, respectively, on Fig. 2; Fig. 5 is a face view of the casing carrying the combination lock and our operating mechanism; Fig. 6 is an edge view of such casing; Fig. 7 is a vertical section through the casing in a plane parallel with Fig. 5 and looking in the opposite direction; Figs. 8 and 9 are vertical sections substantially as indicated by the lines 8—8 and 9—9 of Fig. 5; Fig. 10 is a detail, being a cross section on the line 10—10 of Fig. 7.

As shown in the drawing, 1 represents the automobile body, 2 the dash board thereof, 3 the engine and 4 the fly wheel of the engine. Our mechanism is preferably mounted on the dash board and locks upon the fly wheel.

10 represents the casing of our mechanism, which is a rectangular box secured to the front of the dash board in effective manner, as by screw bolts 11 passing through the dash board into the casing, though other non-accessible fastenings may be employed, if desired.

Mounted in the casing and extending in a direction from front to back is a shaft 12, on the forward end of which is an operating handle 13. Near its rear end, this shaft is provided with an eccentric 14 surrounded by an eccentric strap 15, which is connected to a rod 16 adapted to operate mechanism to clamp the fly wheel of the engine. The strap is shown as readily held in place on the eccentric by a disk 17 screwed to the eccentric proper. The eccentric being rigidly secured to the shaft 12, it is apparent that the movement of the lever 13 may raise or lower the rod 16.

To effectively clamp the fly wheel 4 under the control of the rod 16, we provide a pair of dogs or clamps 20 pivotally secured at 21 in a suitable stationary housing 22, these dogs having pins 23 extending into a horizontal recess in a yoke 24 carried by the lower end of the rod 16. As shown, the housing 22 is in the form of a metal box resting on and secured to stationary parts of the frame, designated 6. The box is continued upwardly by inclined portions 26 terminating in a pair of guides 25 between which the rod 16 slides. 27 indicates a leaf spring within the recess of the yoke 25 and bearing on the pins 23. This maintains a tight connection between the yoke and clamping dogs and prevents rattling or looseness of the parts and enables an automatic compensating adjustment of these dogs so that they may engage and bind opposite sides of the fly wheel rim.

It is to be understood that the normal direction of rotation of the fly wheel 4 is downward on the side where the clamps are located (that is, downward in Fig. 2) and accordingly, when the rod 16 is lowered, the clamps are not only forced by such lowering to bind the fly wheel rim, but any rotation of that rim increases the jamming action of the clamps. When the lever 13 is turned in the upward direction, the eccentric 14 holds the dogs 20 out of engagement with the rim, but when the lever 13 is turned downwardly into the position shown in the drawings, the rim is automatically locked, as explained, and any driving of the automobile is effectively prevented. Accordingly, it is only necessary, in order to lock the automobile, to provide means for locking the shaft 12 against rotation. For this purpose we provide a combination lock, which will now be described, particularly with reference to Figs. 5 to 10 inclusive.

On the shaft 12, within the casing 10, is rigidly secured a block 30 formed with notches 31 and 32 on its opposite ends.

33 indicates a dog having a tooth 34 which is adapted to occupy either notch 31 or 32 which may be presented to it and thereby lock the shaft 12. This dog 33 is pivoted at 37 on a plate 35 which forms the front door of the casing. The plate is normally locked to the casing but may be removed therefrom, together with the dog and its controlling mechanism, as hereinafter described. A knob 36 in the forward side of the plate 35 has a shank passing through a slot in the plate and connected with the dog 33, and this furnishes means for moving the dog to release the block 30. A spring 38 acting on the dog opposes this movement. Whether the dog may be moved by the knob 36 depends on the position of the tumblers of the combination lock. As shown, those tumblers comprise disks, each having a notch which may or may not stand opposite a lug 39 on the dog. When the notches are all opposite this lug, the dog may be moved by the knob 36 to free the shaft 12. When the notches are in any other position, the dog is locked and this locks the shaft.

Any suitable form of combination lock may be employed for controlling the dog 33. The form of lock shown, however, is simple and very effective. It is best shown in Fig. 8. It includes a stem or shaft 40 mounted in the rear side 41 of the housing for the tumblers and extending forwardly through the plate or door 35. On its forward end this stem has a knob 42 by which it may be conveniently turned. Loosely surrounding the stem and held behind the knob against the door 35 is a dial 44. This dial has a hub extending through an opening in the plate 35 and secured on its rear face to a disk 45 which constitutes one of the tumblers. Another disk 46 surrounding the stem is secured to it by a pin 47 and constitutes another tumbler. These two tumblers have notches 48 and 49 designed to coöperate with the lug 39 of the door. The notch 48 in the disk 46 is indicated by broken lines in Fig. 7.

To hold the parts of the combination lock against inadvertent displacement, we provide a saucer-shaped spring 50 surrounding the stem 40 and forcing the tumblers snugly against each other and against the front plate 35, the pin 47 having a slotted connection with the stem 40 to enable this spring to take up looseness. Also we prefer to put a spring 51 in an annular recess on the rear face of the dial 44 to introduce friction between it and the front plate 35. A suitable mark on the front plate adjacent to the dial (as the mark 53, Fig. 5) enables one knowing the combination to properly set the dial with reference thereto to bring the notch 49 opposite the lug 39; and the pin 52 projecting from the knob 42 enables one to turn that knob to the proper position to bring the notch 48 opposite the lug 39. Simply as a blind we may mount on the knob 42 an additional knob 54 having a pin 55, this knob being shown as pressed outwardly by a spring 56. This knob 54 is entirely idle but increases the apparent difficulty of discovering the combination. It will be readily seen, however, that there is such a very large number of possible combinations of positions of the two tumblers that the chance of anyone accidentally discovering the combination, or "picking" the lock, is negligible.

The interior mechanism of the lock, as well as the dog 33, is covered by the housing 41, which is secured to the front plate 35 by internal bolts 58. The front plate, with the lock, is shown as held in place by means of a cleat 60 secured to the plate 35 and overlapping the inner face of the casing 10, and the sliding plate or bolt 61 operated by a knob 62 on the front side of the plate 35 and connected with the bolt by a shank occupying a slot in the front plate. The housing 41 is caused to approach the plate 35 near the edge adjacent to the shaft 12 and it thus stands at the rear of the block 30 when the block is engaged by the dog 33. This is shown best in Fig. 10. Accordingly, when the automobile is locked, the block 30 lying in front of the housing 41 prevents the door 35 being opened, even if the bolt 61 is raised. The notch 31 in the block 30 enables the dog 33 to lock the mechanism when the automobile is locked. The notch 32 in the block 30 enables the dog to lock the mechanism in the reverse position where the arm 13 is projecting upwardly instead of downwardly. In either case, the block 30, by standing in front of the housing 41, prevents the door being opened.

To open the door, it is necessary to set the combination rightly, so that the dog may be withdrawn and then to set the lever 13 at an intermediate or substantially horizontal position. This leaves the automobile unlocked and leaves the door 35 free, so that the knob 62, by being raised, would release the door. This will enable it to be taken out. When the door has been taken out, the lock may be taken apart and the combination changed, if desired. In the specific lock shown the change may be made by removing the pin 65 which holds the knob on the stem 40 and changing the position of the disk 46 on the stem or the position of the disk 45 on the dial. If it is desired to have this mechanism control also the sparking circuit to the engine, or the motive power circuit in an electric machine, this may be very easily accomplished by placing within the casing 10 a contact member and spring, which are adapted to form a part of the circuit but are automatically separated when the lever 13 is turned to locking position. Such an arrangement is shown in Figs. 5 and 9. In those figures, the contact spring forming one terminal is designated 70, and the point with which it coöperates is designated 71. The resiliency of the spring tends to separate these terminals. The shaft 12, however, is provided with an insulated cam 72, which is adapted to bear against the spring 70 and hold it against the terminal 71 when the lever is in its uppermost or unlocked position. As soon, however, as the lever is turned down into locking position, as shown in Fig. 5, the cam releases the spring, which, moving away from the terminal 71, breaks the circuit at this point. Fig. 5 shows a pair of binding posts 73 and 74 connected with the terminals 70 and 71 respectively,—the posts and terminals being properly insulated from the casing.

From the above described construction it will be understood that, in normal running of the automobile, the lever 13 stands extending upwardly (opposite the position shown in the drawings) and that it may be locked in this position by the combination lock acting through the dog 33 in the notch 32. In this position the electric terminals 70 and 71 are maintained in contact; the door 35 is held closed. When it is desired to lock the automobile, the dial 44 is placed with its selected numeral opposite the mark 53, and the knob 42 is turned to bring the pin 52 opposite the second selected numeral on the dial. When the lock is in this position, the knob 36 is moved toward the right and the lever 13 is turned from the uppermost to the lowermost position, thereby clamping the engine fly wheel and breaking the electric circuit. The simple turning of the knob or dial, or both, locks the parts in this position. Should the operator desire access to the interior of the casing to change the combination, or otherwise, he must set the combination at the proper numerals and turn the lever 13 into the intermediate or horizontal position and raise the knob, 62. The casing and the various parts it carries are neat in construction and do not detract in the least from the appearance of the automobile. At the same time, the mechanism is very effective to lock the machine. There is nothing about the mechanism to get out of order. Moreover, by using the combination lock, we avoid the trouble of losing keys, which would frequently result with a key locked device.

Having thus described our invention, what we claim is:

1. The combination, with an automobile and its driving mechanism, of a locking device mounted on the dash board of the automobile, a locking member adapted to engage a moving part of the driving mechanism, connecting mechanism between such member and the locking mechanism, said locking device comprising a casing having a door, accessible operating mechanism at the front, and a combination lock for locking both the operating mechanism and the door.

2. The combination, with an automobile, its driving mechanism and its dash board, of a casing adapted to be secured on the face of the dash board, locking mechanism for a moving part of the vehicle, operating mechanism therefor mounted within said casing and extending outside of the casing, and a combination lock controlling both the operating mechanism and the casing.

3. The combination, with an automobile, its driving mechanism and its dash board, of a casing adapted to be secured on the face of the dash board, a locking member adapted to engage the fly wheel of the engine, an operating mechanism therefor including mechanism extending into said casing, accessible means for operating said mechanism, and a combination lock for locking both said means and said casing.

4. In a device of the character described, the combination of a pair of dogs adapted to engage opposite sides of a movable member, a yoke connected with said dogs, a rod for moving said yoke, a shaft adapted to move the rod, and a lock for the shaft.

5. In a device of the character described, the combination, with a casing, of a shaft therein, means for turning the shaft, means for locking the shaft, a pair of dogs adapted to clamp a fly wheel, and mechanism for operating said dogs connected with and operated by said shaft.

6. In a device of the character described, the combination of a pair of pivoted dogs adapted to engage opposite sides of a fly wheel rim, a yoke having a recess into which project pins from the dogs, an operating rod connected with the yoke, a rock shaft, a connection between it and the rod, means for turning the shaft, and means for locking it.

7. In an automobile lock, the combination of a casing, a shaft extending through the casing, means on the front end of the shaft for turning it, mechanism for locking the automobile connected with a shaft at the rear of the casing, a combination lock within the casing, a knob on the forward side of the casing for controlling such lock, and means within the casing for enabling the lock to lock the shaft.

8. In an automobile lock, the combination of a casing, a door therefor, a combination lock on the inner side of the door, a controlling knob therefor on the outer side of the door, an operating shaft, a block thereon adapted to prevent the opening of the door, the combination lock being adapted to engage said block to lock the shaft, and means for turning the shaft when unlocked, and vehicle locking mechanism controlled by said shaft.

9. In an automobile lock, the combination of a casing, a shaft therein, vehicle locking mechanism controlled by the shaft, means on the front end of the shaft for turning it, a door for the front of the casing, a combination lock on the inner side of the door, a dog on the inner side of the door adapted to lock the shaft and be held in such position by the combination lock, and a knob on the front face of the door for moving said dog when released by the combination lock.

In testimony whereof, we hereunto affix our signatures in the presence of two witnesses.

HERMAN J. RICHNER.
EDWARD H. RICHNER.

Witnesses:
EARL L. BUTLER,
P. N. SMIT.